Oct. 15, 1957 E. W. TUCKER ET AL 2,810,007
ELECTROLYTIC CELLS
Filed May 3, 1956
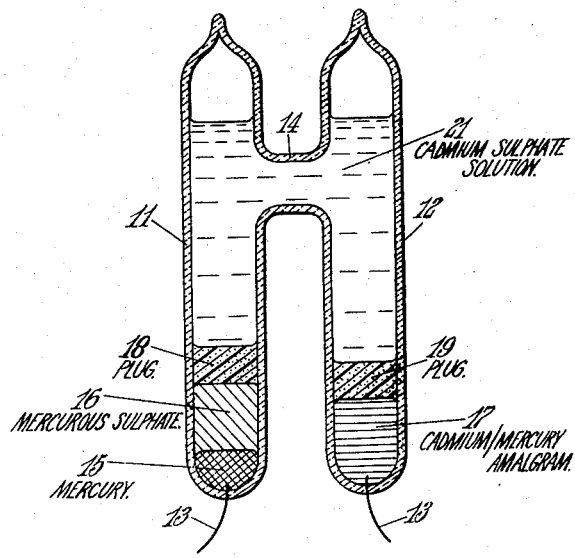
Inventors
E.W. Tucker
J.H. Semark
F.W. Langford

United States Patent Office 2,810,007
Patented Oct. 15, 1957

2,810,007

ELECTROLYTIC CELLS

Edwin William Tucker, James Henry Semark, and Frank William Langford, Beckenham, England, assignors to Muirhead & Co. Limited, Beckenham, England Application May 3, 1956, Serial No. 582,457

Claims priority, application Great Britain December 16, 1955

4 Claims. (Cl. 136—88)

This invention relates to electrolytic cells and methods of making the same and in particular to the kind used as a standard of E. M. F. such as the Weston standard cell.

In its well-known form the Weston cell consists of an arrangement of glass tubes in the form of an H, the two vertical limbs of which contain the active sections of the cell, each of the limbs having a platinum wire sealed into its lower end to form the external electrical connection. One limb contains a quantity of cadmium/mercury amalgam, and the other limb contains a quantity of mercury with a layer of mercurous sulphate resting upon it. Each limb is then filled to a certain height with cadmium sulphate crystals and a quantity of cadmium sulphate solution is added, sufficient to bring the liquid level above the cross-limb of the H so that there is an electrically conductive path between the two limbs.

In old constructions the active elements were held in position by a crystal locking method. By a process of slow evaporation the cadmium sulphate crystals were caused to grow and lock together in a porous mass.

In this type of cell the cadmium sulphate solution is always in the saturated state. Another type of cell is produced in which the concentration of the cadmium sulphate solution is slightly below saturation point and the cadmium sulphate crystals are omitted.

The crystal locking method already described is not suitable for cells to be used in portable apparatus since shocks are liable to dislodge the crystals and the method is not applicable in the case of the unsaturated type of cell. Other constructions have therefore been devised in which a porous membrane or diaphragm is placed on top of the layer of crystals, or the other constituents, and is held in position by suitable means such as a springy ring.

The invention consists of a cell of the kind described in which the active constituents are retained in position by means of plugs made of a sintered, porous, thermoplastic material generally unaffected by the constituents of the cell. Such plugs are simple to produce and easily inserted.

The invention further consists of a method of making a cell using plugs of the kind described in the previous paragraph which are of a diameter slightly larger than the internal diameter of the tubes forming the cell and which are heated to a temperature at which they begin to soften and then quickly pushed into the required position relative to the active constituents of the cell so that they cool and harden in position in the tube or tubes. When the cell is made by this method the plugs, once inserted, remain firmly fixed in position.

The invention will be further described with reference to an embodiment shown in the accompanying drawing.

To prepare the cell shown in the drawing two tubes 11 and 12 are provided having an internal diameter of 0.32 inch with their lower ends closed, platinum wires 13 being sealed into the lower ends of the tubes. The two tubes 11 and 12 are joined by a short cross tube 14 at about 1¼ inches from their closed ends, and at this stage will be open at the top. To fill the cell a quantity of mercury 15 is placed in tube 11 followed by a layer 16 of mercurous sulphate made into a paste with cadmium sulphate solution. A quantity of cadmium/mercury amalgam 17 is placed in tube 12.

Two plugs 18 and 19 having a diameter of 0.33 inch (i. e. .01 inch larger than the internal diameter of the tubes) are cut from a sheet of porous thermoplastic material 5/32 inch or 3/16 inch thick. The material may consist, for example, of high molecular weight polythene or P. T. F. E. (poly-tetra-fluoro-ethylene) which has been prepared by sintering particles of a desired size by heating them to such a temperature that they just become plastic and therefore fuse on to each other to form a porous mass. Such a sintered plastic material is available under the Registered Trademark "Vyon," grade 3.

The plugs 18 and 19 are heated to a temperature which is sufficient to soften them, when they become resilient, somewhat like soft rubber. Whilst in this condition they are quickly forced into the tubes 11 and 12 and on to the mercurous sulphate paste and the cadmium/mercury amalgam respectively. The plugs then cool and harden whilst in contact with the walls of the tubes and are thereafter firmly fixed.

The tubes are next filled with an electrolyte 21 consisting of cadmium sulphate solution of a strength slightly below saturation point to a level above the cross-tube 14 joining the tubes, and the tubes are then sealed off in a suitable manner.

To ensure that all air is expelled from the pores of the plastic, a very small amount of electrolyte may be placed in each tube 11 and 12 after inserting the mercurous sulphate paste and the amalgam respectively, and before insertion of the plugs 18 and 19 to ensure that as the plugs are pushed home the electrolyte is forced into the pores to expel air.

The pore size of the plastic plugs may conveniently be 70–100 microns (0.07–0.1 mm.) and should be such that the cadmium/mercury amalgam and the mercurous sulphate paste are not easily forced into the pores at normal pressures. It will be understood that a decrease in the pore size or an increase in the thickness of the plug 18 or 19 will lead to an increase in the internal resistance of the cell and vice versa.

From the description given above it will be evident that the invention may be applied to a saturated type of cell containing cadmium sulphate crystals. It may also be applied to cells of other construction such, for example as that described in Patent No. 2,553,068.

We claim:

1. A method of manufacturing an electrolytic standard cell comprising the steps of inserting active constituents in each tube forming a limb of the cell, providing a plug made of a sintered porous thermoplastic material, the plug being initially of a diameter slightly larger than the diameter of the tube, heating the plug to a temperature at which it becomes soft, inserting the plug in the tube to the required position and allowing it to cool and harden in position.

2. A method, as claimed in claim 1, including the step of placing a small amount of electrolyte in the tube before inserting the plug so that the electrolyte is forced into the pores of the plug when the plug is inserted.

3. An electrolytic standard cell, when made according to the method of claim 1.

4. An electrolytic standard cell, when made according to the method of claim 2.

References Cited in the file of this patent

UNITED STATES PATENTS

| | | |
|---|---|---|
| 485,089 | Carhart | Oct. 25, 1892 |
| 1,379,698 | Rottmann | May 31, 1921 |
| 2,553,068 | Tucker | May 15, 1951 |
| 2,613,234 | Eppley | Oct. 7, 1952 |

FOREIGN PATENTS

| 628,372 | Great Britain | Aug. 26, 1946 |
|---|---|---|